United States Patent [19]

Morton

[11] Patent Number: 4,509,965

[45] Date of Patent: Apr. 9, 1985

[54] WATER-STEAM SEPARATOR

[76] Inventor: Willard Morton, 12272 17th Ave., South, Burnsville, Minn. 55337

[21] Appl. No.: 466,053

[22] Filed: Feb. 14, 1983

[51] Int. Cl.³ .............................................. B01D 45/16
[52] U.S. Cl. ........................................ 55/399; 55/457
[58] Field of Search ................. 55/199, 203, 207, 399, 55/447, 456, 457, 463; 122/488, 492

[56] References Cited

U.S. PATENT DOCUMENTS

| 445,472 | 1/1891 | Manning | 55/447 |
|---|---|---|---|
| 486,144 | 11/1892 | Webber | 55/457 |
| 3,724,180 | 4/1973 | Morton et al. | 55/456 |
| 3,822,533 | 7/1974 | Oranje | 55/456 |
| 4,263,029 | 4/1981 | George | 55/457 |
| 4,290,791 | 9/1981 | Matsui et al. | 55/457 |

Primary Examiner—David L. Lacey
Attorney, Agent, or Firm—Malcolm Reid

[57] ABSTRACT

A water-steam separator to be used in conjunction with a steam humidifier system used to maintain the relative humidity within a desired range in buildings. The water-separator comprising a body in the form of a closed cylindrical tank with a top end and a bottom end. The water-steam separator also comprises a flow diverter internal to the body which divides the body into a condensate area and an inlet-outlet area; the flow diverter extending substantially from the top end of the body to the bottom end of the body. A partition further divides the inlet-outlet area into a separate outlet area and a separate inlet area. The water-steam separator is fitted with a water drain, a water steam inlet, and a steam outlet.

6 Claims, 4 Drawing Figures

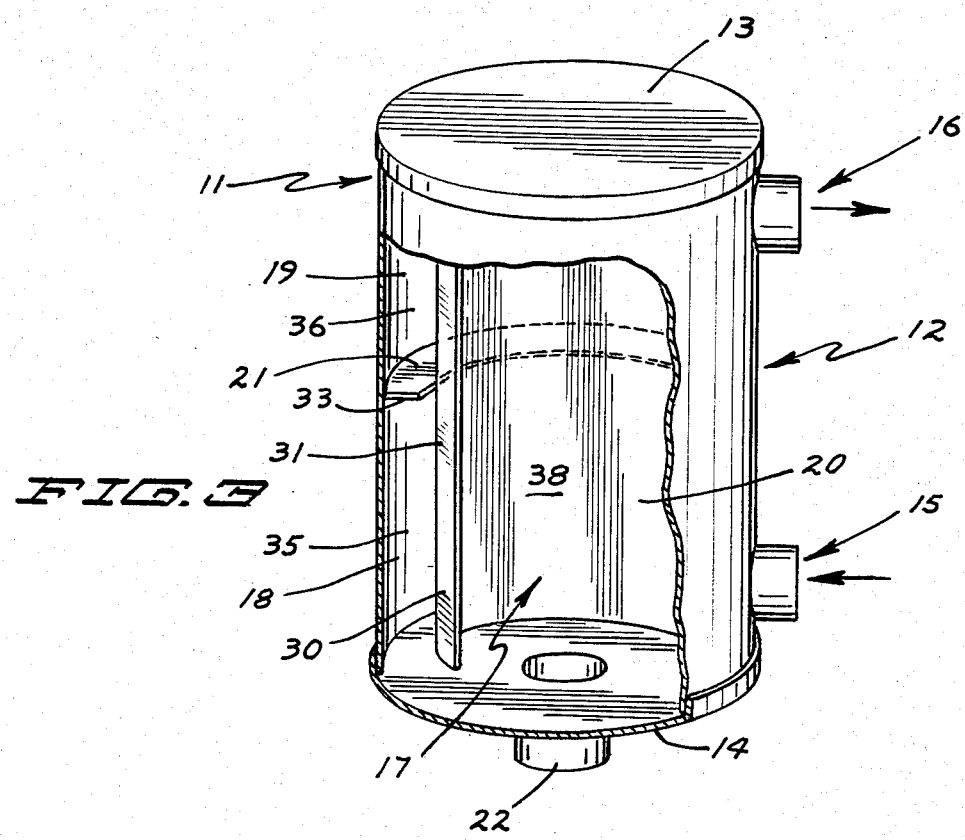
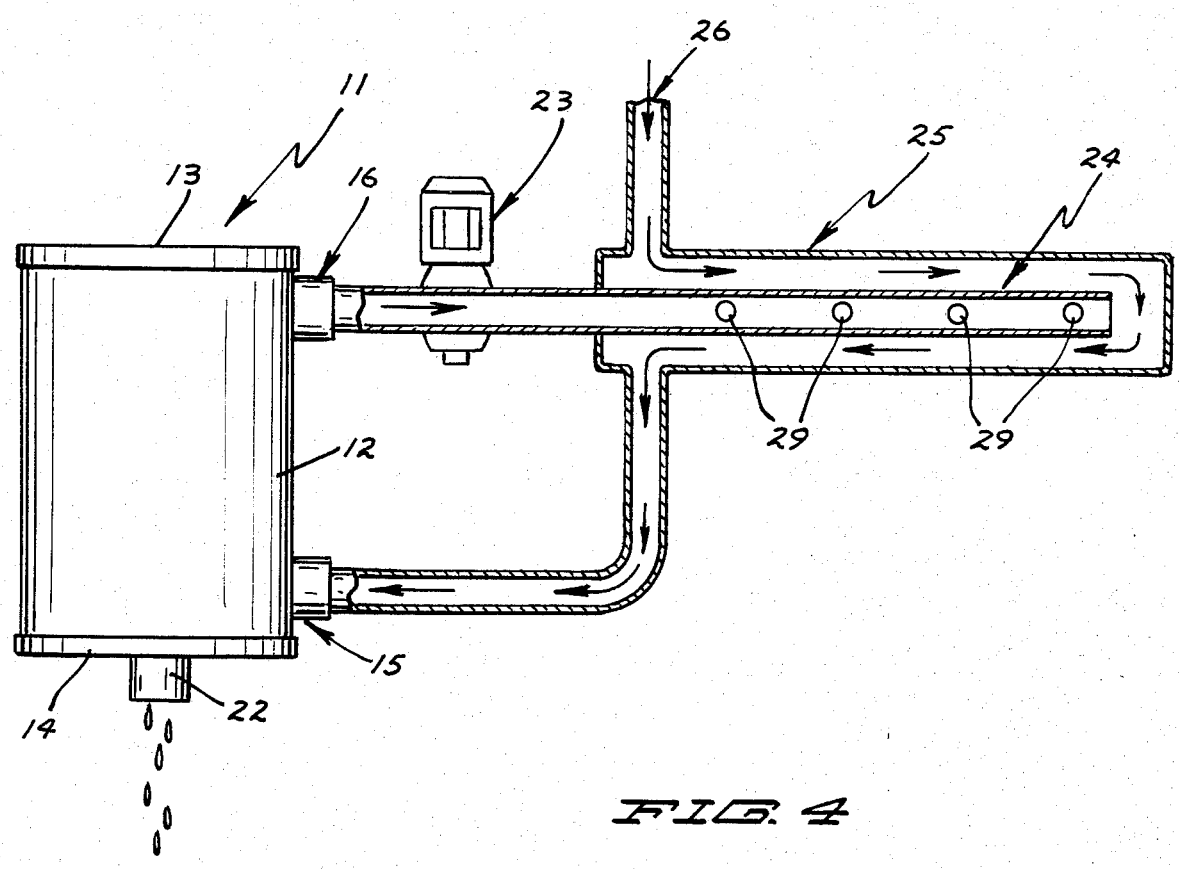

WATER-STEAM SEPARATOR

BACKGROUND OF THE INVENTION

1. Field of the Invention

This invention relates to an apparatus for separating water from steam for use in a steam humidifier system.

2. Description of the Prior Art

In the prior art the separation of water from steam for use with a steam humdifier system has been attempted and a prior method is illustrated by U.S. Pat. No. 3,724,180, jointly invented by Bernard W. Morton and Willard E. Morton. Willard E. Morton is the inventor of the present invention. U.S. Pat. No. 3,724,180 presents a method of separation of water from steam utilizing the centrifugal force method. The present invention also uses a water-steam separator which employs the principle of centrifugal force. However, the configuration used for the separation of water and steam in the present invention differs substantially from that shown in U.S. Pat. No. 3,724,180 and results in a smaller percentage of water exiting the separator with the steam. The velocity of the steam through the separator of the present invention is also retained to a greater extent using the apparatus of the present invention which results in more rapid dispersion of the steam into the heating system with which it is associated. As a result, the desired humidity level can be achieved more quickly.

SUMMARY OF THE INVENTION

This invention is used to separate water from steam. The separation of water from steam is particularly necessary for use in humidifiers which are utilized in buildings to control the humidity level in response to a humidity sensing control. In a humidifying system used in conjunction with a heating system, there is generally a dispersion tube which is placed in the heat ducts of a heating system. Steam which exits from the dispersion tube is easily carried by the flow of air in the heat duct and thereby distributed throughout the building. However, water that may exit from the dispersion tube drips down into the duct and the heating system causing corrosion and water leakage problems. A water-steam separator, thereby, becomes a necessary element of a steam humidifier system.

The present invention utilizes a water-steam separator which is in line between a source of water-steam and a steam dispersion tube which is placed in ducts of heating systems. The body of the separator is generally cylindrical in shape and has a top end and a bottom end thereby forming an enclosed cylindrical tank. The body is fitted with a steam-water inlet means near the bottom end. The body is also fitted with a steam outlet means near the top of the body on the cylindrical wall of the body. The inlet and outlet means are vertically positioned in line with one another.

A flow diverter having an arcuate surface is attached to the inside wall of the cylinder so that it runs substantially from the top of the cylinder to the bottom of the cylinder. The flow diverter is affixed inside the body so that its convex side is facing the inlet and outlet means. The flow diverter is fixed to the inside cylindrical wall of the body by a flange which lies tangentially and adjacent to the inside cylindrical wall of the body. The flange is spot welded down the length of the body. The arcuate shaped diverter is affixed to the inside wall of body to the left of the inlet and outlet means, left being defined when looking at the top of the body toward the bottom of the body with the inlet and outlet means facing the observer. The arcuate surface of the flow diverter has a diameter which is smaller than that of the body. The flow diverter extends from its flange attachment point to a line which is in a plane which is perpendicular to the inlet and outlet means and which forms a diameter of the cylindrical body. It extends to a line which is approximately the distance from the inlet and outlet means which is over 80% of the diameter of the cylindrical body. The arcuate surface of the flow diverter then reverses on itself to form a tab which is at approximately 90° to the surface of the flow diverter. The reverse tab extends inwardly away from the convex surface of the flow diverter.

A horizontal partition is inserted approximately halfway between the inlet means and the outlet means in the area defined by the flow diverter convex surface and the inside wall of the cylindrical body. The partition extends to the reverse tab of the flow diverter.

At the center of the bottom end of the body a drain is attached. The bottom end of the body generally slopes toward the drain located at its center thereby allowing condensate to flow toward the drain.

Water-steam enter at the inlet means and are diverted in an annular direction by the flow diverter, the partition, and the inner wall of the body. The flow diverter convex surface, the partition, and the inner wall of the body define an inlet area. The flow continues to the opening defined by the reverse tab of the flow diverter, the inner wall of the body, and the free end of the partition. This area is defined as the condensate area inlet. In the condensate area which is defined by the concave surface of the flow diverter and the inside wall of the cylindrical body, steam begins to rise even though it is continuing to swirl in a circular pattern. The water droplets being heavier than the steam continues around the inner wall of the cylindrical body and then along the concave wall of the flow diverter in an annular pattern until it impinges upon the wall of the reverse tab. The condensate that hasn't already been removed by gravity is caused to run down the wall of the reverse tab and out the drain means. The balance of the steam which has risen to the point where it is above the level defined by the upper wall of the partition reverses its flow around the reverse tab and enters the condensate area outlet which is defined by the reverse tab of the diverter, the free end of the partition, and the wall of the cylindrical body. The steam then continues to rise and continues in an annular fashion through the outlet area which is defined by the wall of the cylindrical body, the top of the partition, and the convex surface of the flow diverter. The steam ultimately leaves by the separator outlet for dispersion into the heat duct to provide humidification of the environment.

BRIEF DESCRIPTION OF THE DRAWINGS

FIG. 3 is a cut-a-way perspective view of the separator looking from the condensate area with the top end of the body in place.

FIG. 4 is a diagrammatic view of a humidifer system with a water-steam separator of the present invention.

DESCRIPTION OF THE PREFERRED EMBODIMENT

Figure 1:
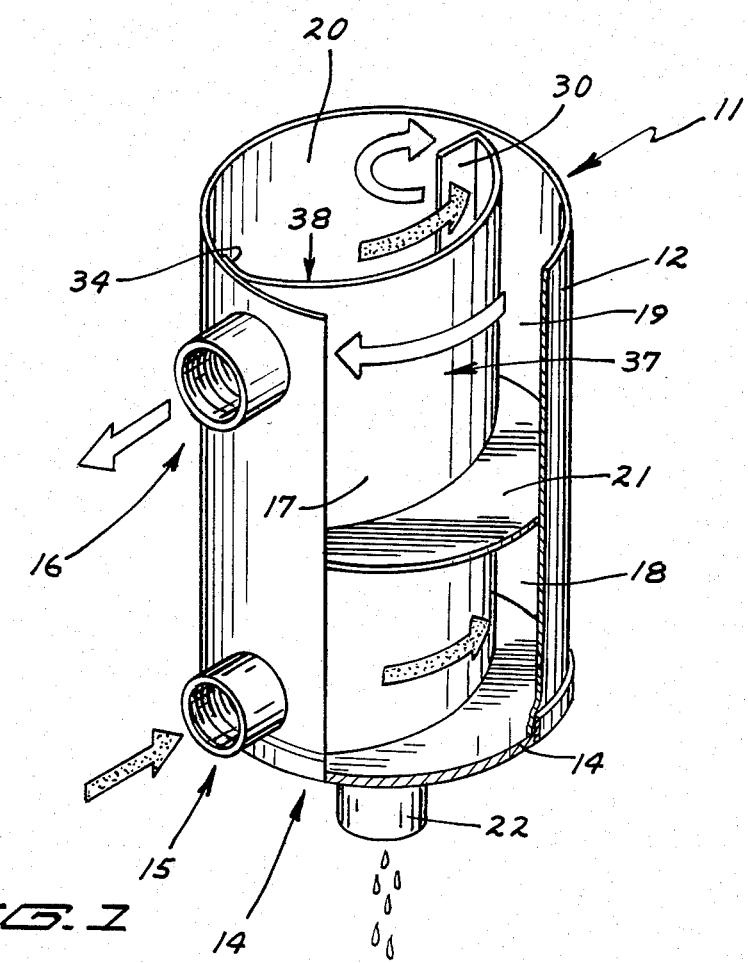
FIG. 1 is a cut-a-way perspective view of the separator showing water-steam travel looking from the inlet/outlet side of the flow diverter with the top end of the separator body removed.

The water-steam separator 11 as shown in FIG. 1 has its top end 13 removed for illustration purposes. The separator 11 consists of a cylindrical body 12 having a top end 13 and bottom end 14 thereby forming an enclosed container. The bottom end 14 is fitted with a drain 22 which is comprised of a hole at the center of the bottom end 14 and a threaded coupling brazed to the hole. The threaded coupling is then attached to a conduit for disposal of the water which is separated from the steam in the separator 11.

An inlet 15 is located on the cylindrical side of the body 12. It too consists of a hole in the body 12 with a threaded coupling or nipple brazed to the hole for connection to a conduit. The conduit connects to a source of water-steam. Directly above the inlet 15 is an outlet 16. The outlet 16 also consists of a hole in the cylindrical side of the body 12 with a threaded coupling or nipple brazed to the hole for connection to a humidifier system. After the water is separated from the water-steam mixture, virtually pure steam exits from the outlet 16 for use in the humidifier system.

The bottom end 14 of the separator body 12 slopes from the outer periphery of the cylindrical separator 11 toward the drain 22 so that condensate is able to flow by gravity into the drain 22. The bottom end 14 of the body 12 is brazed to the cylindrical sides of the body 12. The top end 13 of the body 12 is a flat member which is also brazed to the outer periphery of the cylindrical sides of the body 12. The top end 13 comes in contact with the top edge of the flow diverter 17, although there may be a small amount of separation between the top edge of the flow diverter 17 and the top end 13 of the body 12 without an appreciable reduction in the efficiency of the water-steam separator.

Internal to the body 12 is the flow diverter 17 which runs from the bottom end 14 to the top end of the separator body 12. The flow diverter 17 is arcuate in shape. It has a flange 34 for connection to the side wall of the cylindrical body 12. The flange 34 consists of a reverse bend away from the convex surface 37 of the flow diverter 17 so that the flange 34 lies adjacent, parallel, and tangential to the wall of the cylindrical body 12. The flow diverter 17 is spot welded at this flange 34 along the length of the flange 34. The arcuate shape of the flow diverter 17 is defined by a diameter which is less than the diameter of the cylindrical body 12. The flange 34 of the flow diverter 17 is welded to the left of the inlet 18 and outlet 19 as the separator 11 is being viewed from the top end 13 with the inlet 15 and outlet 16 facing the observer. The arcuate surface of the flow diverter 17 extends convexly from the flange 34 toward the inlet 15 and outlet 16 to a line which is in a plane which is defined by a diameter of the body 12 which diameter cuts through the inlet 15 and outlet 16 at a right angle. The line is located along this plane at a point which is somewhat over 80% of the diameter of the cylindrical body distant from the inlet 15 and outlet 16.

The flow diverter 17 terminates in a reverse tab 30 which is at right angles to the surface of the flow diverter 17 and which extends inwardly from the convex surface 37 of the flow diverter 17.

The horizontal partition 21 lies between the inlet 15 and outlet 16 at a point approximately halfway between them. The partition 21 separates the space between the inlet 15 and the outlet 16 in the area defined by the convex surface 37 of the flow diverter 17 and the inside wall of the cylindrical body 12. The partition terminates at the reverse tab 30 end of the flow diverter The partition 21 is affixed in the separator 11 so that it slopes slightly from the inlet/outlet end of the partition 21 towards the diverter reverse tab 30. The partition 21 is also spot welded into place.

The body 12 and its internal parts are all made of stainless steel to avoid rust and to provide a strong lightweight apparatus.

Figure 2:
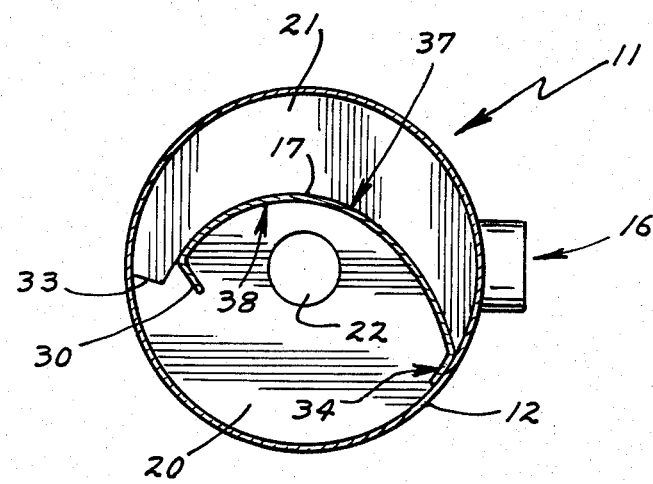
FIG. 2 is a top end view of the separator.

FIG. 2 shows a top end view of the separator 11 wherein placement of the flow diverter 17 and its shape and relative dimensions is clearly shown.

FIG. 3 shows a cut-a-way perspective view of the separator 11 looking from the condensate area 20. The condensate area 20 is defined by the concave surface 38 of the flow diverter 17, the reverse tab 30 of the flow diverter 17 and the inner cylindrical wall of the body 12.

FIG. 1 more clearly shows the outlet area 19 which is defined by the convex surface 37 of the flow diverter 17, the top of the partition 21, and the inner wall of the cylindrical body 12. FIG. 1 also clearly shows the inlet area 18 which is defined by the convex surface 37 of the flow diverter 17, the bottom wall of the partition 21, and the inner surface of the separator body 12.

FIG. 3 clearly shows the condensate area inlet 35 which is defined by the reverse tab 30 end of the diverter 31, the free end of the partition 33, the bottom end 14 of the body 12, and the cylindrical wall of the body 12. FIG. 3 also shows the condensate area outlet 36 which is defined by the reverse tab 30 end of the diverter 31, the free end of the partition 33, the inner cylindrical wall of the body 12, and the top end 13.

FIG. 4 is a diagrammatic view of a humidifier with the water-steam separator 11 of the present invention. In FIG. 4 steam with water appears at point 26. A steam-water combination passes through the jacket 25 and then through the inlet 15 of the separator 11. The water-steam combination passes through the separator 11 whereby water is removed from the water-steam combination by the separator 11 by the water exiting at the drain 22 of the separator 11. The virtually pure steam exits at the outlet 16 of the separator 11 through the steam valve 23 into the dispersion tube 24. The virtually pure steam passes out of the dispersion tube 24 through the dispersion tube outlet ports 29 and into the air stream in a heating system or other environment to be humidified. The steam valve 23 regulates the flow of the steam to the dispersion tube 24 and is controlled by a sensor placed in the environment which senses whether a predetermined level has been achieved. In the event the level has been achieved the steam valve 23 is closed so that no steam exits from the dispersion tube outlet ports 29. As the humidity level of the environment falls below the desired level the steam valve 23 is opened allowing more humidity to pass into the environment. The dispersion tube 24 jacket 25 allows the dispersion tube 24 to be preheated so that condensation does not take place in the dispersion tube 24, since the flow of the water and steam around the dispersion tube 24 keeps the dispersion tube 24 at a temperature which is nearly equivalent to the temperature of the steam entering the dispersion tube 24 from the outlet 16 of the separator 11.

OPERATION OF THE PREFERRED EMBODIMENT

The source of steam generally contains a combination of water and steam. In an environment which must be humidified, it is desirable to have pure steam as opposed to a combination of water and steam. The reason for this is that the most typical means of distributing humidity throughout a building is through the use of a steam dispersion tube 24 placed in a heat duct of the heating system used to heat the building. If the combination of water and steam are dispersed out of the steam dispersion tube 24 and placed into the airflow of the heat duct, only the steam will be carried with the air through the duct system and out into the various areas of the building. The water being heavier than the steam will fall to the bottom of the heat duct where it will cause a leakage and puddling problem as well as a corrosion problem. Another important problem to be avoided is the mineral build up which results with evaporation of the water as it drips into the heating system.

The water-steam separator 11 of the present invention allows a water-steam combination to enter the inlet 15 of the separator 11. The water-steam combination enters the inlet 15 at a predetermined velocity and pressure. As the water-steam combination hits the flow diverter 17 it is diverted from its forward movement through the inlet 15 and forced to travel in an annular direction as defined by the arcuate surface of the flow diverter 17 and the inside cylindrical walls of the body 12 of the separator 11. During its course of travel through the inlet area 18 a certain amount of condensate is separated from the steam and flows down the walls of the flow diverter 17 or the body 12 or simply falls to the bottom of the separator 11 through the steam. When the condensate hits the bottom end 14 of the separator 11, the sloping surface of the bottom end 14 leads the condensate to the drain 22. The sloping surface of the bottom end 14 of the separator 11 and the relatively straight edge of the lower end of the diverter 17 allows a small passage way for condensate to flow from the inlet area 18 under the diverter 17 and into the drain 22. Most of the water remains in the steam-water mixture after it passes through the condensate area inlet 35. In the condensate area 20 the steam-water combination continues on in its annular path. Since the water is heavier than the steam it has more of a tendency to stay to the outside of the inner wall of the body 12 due to centrifugal force than does the steam. Therefore, much of the steam begins to rise through the central portion of the condensate area 20. Water or condensate, on the other hand, begins to flow down the inner wall of the separator towards the drain 22. As the water-steam combination continues in its annular path, it impinges upon the concave surface 38 of the flow diverter 17 where the process of elimination of the water from the steam-water combination continues. The water that remains in the steam is virtually all removed as it impinges upon the reverse tab 30 of the flow diverter 17. That water is virutally stopped by the reverse tab 30 and flows down the wall of the reverse tab 30 to the drain 22. The rising steam then reverses its annular direction and passes into the condensate area outlet 36 which leads to the outlet area 19. Again, the steam assumes an annular direction, this time the direction is the reverse of what it was prior to entering the outlet area 19. At this point any remaining condensate falls to the top of the partition 21 which slopes towards the bottom end 14 of the separator 11. The water then drips off of the free end 33 of the partition 21 to the bottom end 14 of the separator 11 and out the drain 22. Meanwhile, the virtually pure steam exits the separator through the outlet 16 and continues on its path to the dispersion tube 24 of the humidifier system. The dispersion tube 24 is generally placed in a heating duct where the pure steam exits at the dispersion tube outlet ports 29 and is carried through the heat duct system by the flow of heated air. The humidified air then enters the various heated areas of the building.

While I have disclosed a preferred embodiment description and application of the invention, other modifications of the invention not specifically disclosed or referred to will be apparent to those skilled in the art in light of the foregoing description. This description is intended to provide a concrete example of a preferred embodiment structure and application clearly disclosing the present invention and its operative principles. Accordingly, the invention is not limited to any particular embodiment or configuration of component parts thereof. All alternatives, modifications and variations of the present invention which fall within the spirit and broad scope of the appended claims are covered.

What is claimed is:

1. A water-steam separator comprising:
   (a) a body having a top end and a bottom end;
   (b) a drain means in the body;
   (c) an inlet means in the body;
   (d) an outlet means in the body;
   (e) a flow diverter in the body and positioned and arranged with respect to the inlet and outlet means and the drain means so as to divide the body into a condensate area having the drain means within the condensate area and an inlet-outlet area, the flow diverter extending substantially from the top end of the body to the bottom end of the body; and
   (f) a partition positioned inside the inlet-outlet area and positioned with respect to the diverter so as to divide the inlet-outlet area into a separate outlet area and a separate inlet area such that vapor entering through the inlet means is forced to travel first through the inlet area, then into the condensate area, and finally through the outlet area to the outlet means.

2. The water-steam separator specified in claim 1, wherein the inlet means is positioned in the body below the position of the outlet means in the body such that the inlet area is below the outlet area.

3. The water-steam separator specified in claim 1, wherein the flow diverter has an end which is unattached to the body to which a reverse tab is affixed.

4. The water-steam separator specified in claim 1, wherein the partition has an unattached end which is at a lower elevation than the partition end nearest the inlet and outlet means.

5. The water-steam separator specified in claim 1, wherein the bottom end slopes from the body periphery towards the drain means.

6. The water-steam separator specified in claim 1, wherein the flow diverter is arcuate in shape.

* * * * *